United States Patent [19]

Chane-Ching et al.

[11] Patent Number: 5,080,877

[45] Date of Patent: * Jan. 14, 1992

[54] NOVEL CERIUM OXIDE PARTICULATES

[75] Inventors: Jean-Yves Chane-Ching; Jean-Yves Dumousseau, both of Paris, France

[73] Assignee: Rhone-Poulenc Specialties Chimiques, Courbevoie, France

[ * ] Notice: The portion of the term of this patent subsequent to Apr. 28, 2004 has been disclaimed.

[21] Appl. No.: 461,623

[22] Filed: Jan. 8, 1990

Related U.S. Application Data

[60] Continuation of Ser. No. 779, Jan. 6, 1987, abandoned, which is a division of Ser. No. 703,474, Feb. 20, 1985, Pat. No. 4,661,330.

[30] Foreign Application Priority Data

Feb. 20, 1984 [FR] France .................. 84.02507

[51] Int. Cl.⁵ ............................ C01F 17/00
[52] U.S. Cl. .................. 423/263; 502/304; 502/439
[58] Field of Search .......... 423/263, 21.1; 502/304, 502/439

[56] References Cited

U.S. PATENT DOCUMENTS

| | | | |
|---|---|---|---|
| 3,770,422 | 11/1973 | Darnell | 423/263 |
| 4,356,106 | 10/1982 | Woodhead et al. | 423/263 |
| 4,360,388 | 11/1982 | Nauroth et al. | 106/288 B |
| 4,529,410 | 7/1985 | Khaladji et al. | 423/263 |
| 4,606,847 | 8/1986 | Woodhead | 423/263 |
| 4,661,330 | 4/1987 | Chane-Ching et al. | 423/263 |
| 4,663,137 | 5/1987 | Chane-Ching et al. | 423/263 |

FOREIGN PATENT DOCUMENTS

| | | | |
|---|---|---|---|
| 0033843 | 8/1981 | European Pat. Off. | 423/263 |
| 0154010 | 2/1982 | Fed. Rep. of Germany | 423/263 |
| 859854 | 12/1940 | France . | |
| 145370 | 12/1977 | Japan . | |
| 53-40077 | 10/1978 | Japan . | |
| 0833525 | 5/1981 | U.S.S.R. | 423/263 |
| 488008 | 6/1938 | United Kingdom . | |

OTHER PUBLICATIONS

C.R. Acad. Sc. Paris t. 292 (Mar. 1981) pp. 883–885.
Chemical Abstract 89:11402w.
Chemical Abstract 95:132221u.
S. Horsley et al., Symp. Eur. Metall. Poudres, 4th, 1 Paper 12, 1975.
R. Sh. Mikhail et al., J. Appln. Chem., 20, 7, 222–225 (1970).

Primary Examiner—Melvyn J. Andrews
Attorney, Agent, or Firm—Burns, Doane, Swecker & Mathis

[57] ABSTRACT

Morphologically improved cerium oxide particulates having low sulfur content, useful, e.g., as catalyst-/catalyst supports, and having a B.E.T. specific surface of at least 130 m²/g measured at a temperature ranging from 400° C. to 500° C., are prepared by reacting an aqueous solution of cerium (IV) salt with an aqueous solution of sulfate ions to precipitate a basic ceric sulfate, filtering the precipitate which results, washing and optionally drying said precipitate, and thence calcining same.

7 Claims, 1 Drawing Sheet

← 100 μm →

← 1 μm → ions is preferably distilled water or water purified by

NOVEL CERIUM OXIDE PARTICULATES

This application is a continuation of Ser. No. 07/000,779 filed Jan. 6, 1987 now abandoned which in turn is a division of Ser. No. 06/703,474 filed Feb. 20, 1985 now U.S. Pat. No. 4,661,330.

BACKGROUND OF THE INVENTION

1. Field of the Invention

The present invention relates to a novel ceric oxide having new and improved morphological properties, and, more especially, a novel ceric oxide having a low content in sulfur. It also relates to the preparation of such novel ceric oxide.

In the description which follows, by the term "specific surface" there is intended the specific B.E.T. surface, determined in accordance with the BRUNAUER-EMMETT-TELLER method described in *Journal of the American Chemical Society*, 60, 309 (1938).

2. Description of the Prior Art

It is known to this art that ceric oxide, whether alone or in a mixture with other metallic oxides, is useful as a catalyst for the synthesis, in particular, of methanol [C. R. Séances, *Acad. Sci.*, Ser. 2, 292 (12), 883-5 (1981)] or in methods for treating residual gases (published Japanese Patent Application No. 76/62,616).

In order to demonstrate good catalytic reactivity, it is desirable to use a ceric oxide which has the greatest possible specific surface.

To date, however, most methods for the preparation of ceric oxide do not enable the attachment of this result.

For example, a method of preparing cerium (IV) oxide by the thermal decomposition of cerium (III) oxalate is known, from the article by S. Horsely, J. M. Towner and M. B. Waldron [Preprints, *Symp. Eur. Metall. Poudres*, 4th, 1, paper 12 (1975)].

The subject treatment, carried out at 450° C., provides a ceric oxide having a specific surface of only 69 m$^2$/g.

Compare also R. Sh. Mikhail, R. M. Cagr and R. B. Fahin, *J. Appln. Chem.*, 20, 7, 222-225 (1970) which features the structure of ceric oxide, and reports the characteristics of the ceric oxide prepared by the calcining of ceric hydroxide obtained by treatment of a solution of cerous nitrate with ammonia in the presence of hydrogen peroxide. It is noted, however, that the ceric oxide obtained by calcining at 400° C. has a specific surface of only 80 m$^2$/g.

SUMMARY OF THE INVENTION

Accordingly, a major object of the present invention is the provision of a novel ceric oxide having a specific surface greater than that hitherto known to this art, i.e., a specific surface of at least 85±5 m$^2$/g for a temperature of measurement ranging from 350° C. to 500° C.

DETAILED DESCRIPTION OF THE INVENTION

Figure 1:
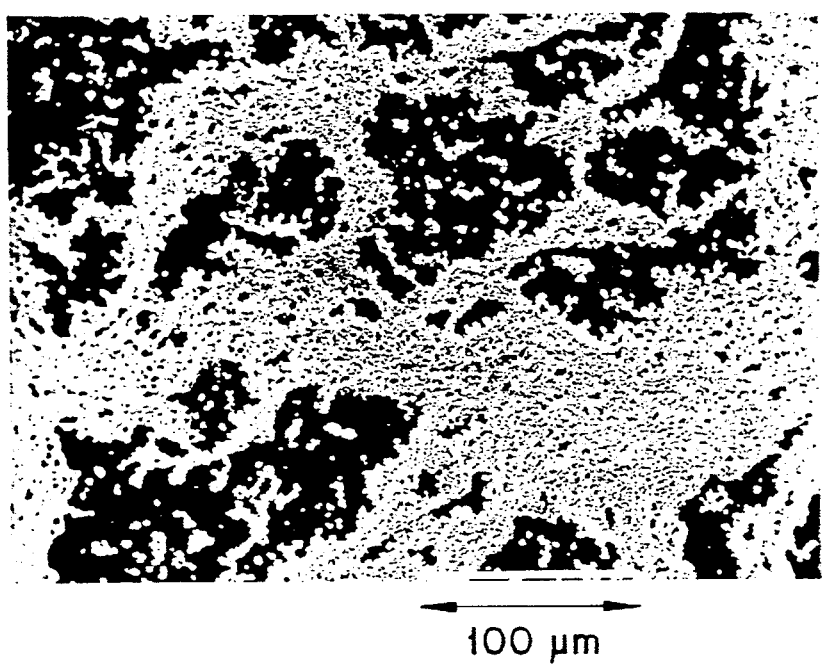
FIGS. 1 and 2 are photomicrographs taken with a scanning electronic microscope illustrating the morphology of the ceric oxide which can be obtained in accordance with the invention.

More particularly according to the present invention, the novel ceric oxide preferably has a specific surface of at least 130 m$^2$/g at a temperature of from 400° C. to 500° C., and a maximum specific surface of about 150 to 180 m$^2$/g at a temperature of from 400° C. to 500° C.

The ceric oxide according to the invention is also characterized in that it comprises but a small amount of sulfur, present in the form of sulfate ions. The amount of residual sulfate ions in the subject ceric oxide will hereinafter be more fully described.

The invention also features a process for the preparation of the subject ceric oxide particulates having large specific surface, comprising precipitating basic ceric sulfate by reacting an aqueous solution of cerium (IV) salt and an aqueous solution containing sulfate ions, filtering the resultant precipitate, washing and optionally drying same, and then calcining said washed and optionally dried precipitate.

In the first step of the process of the invention, a basic ceric sulfate having the formula Ce(OH)$_{4-x}$(SO$_4$)$_{x/2}$ in which x is greater than 0 and less than 4 is prepared.

For this purpose, one begins with an aqueous solution of cerium (IV) which may be an aqueous solution of ceric nitrate or an aqueous solution of ammonium ceric nitrate. Said solution may contain cerium in cerous state without any drawback, but it is desirable for it to contain at least 85% of cerium (IV) in order to obtain a good yield of precipitation.

The cerium salt is selected in such manner that it does not contain impurities which could be transferred into the final product after calcining. It may be advantageous to use a cerium salt having a degree of purity of more than 99%.

The concentration of the cerium salt solution is not a critical factor according to the invention. When expressed as cerium (IV), it may vary from 0.3 to 2 mols/liter.

The aqueous solution containing the sulfate ions is prepared from an alkali or alkaline earth metal or ammonium sulfate, or by the bubbling of a gas containing sulfur in water, such as, for example, sulfur dioxide or sulfur trioxide. Ammonium sulfate is preferably used since the ammonium ion is easily eliminated upon the heat treatment of the precipitate. It is preferable to use an ammonium sulfate having a degree of purity of more than 99%.

Sulfuric acid can also be used a a generator of sulfate ions, provided that the acidity imparted corresponds to, or is adjusted in such manner as to provide the conditions necessary for obtaining the desired precipitate.

The water comprising the aqueous solutions of cerium (IV) salt and the solution containing the sulfate ion exchange.

The aqueous reaction medium advantageously has an acidity ranging from 10$^{-2}$ N to 1 N, and preferably from 0.1 N to 0.5 N.

The acidity may be contributed by the commencement of a hydrolysis reaction, since one mole of hydrated ceric oxide is formed accompanied by the liberation of 4 protons.

The acidity may also be imparted by the addition of an inorganic acid thereto. Preferably nitric acid or sulfuric acid is selected. An acid, which may be concentrated or dilute, for example, up to 10$^{-2}$ N, can be used.

The acidity may also emanate from the ceric nitrate solution, which may be slightly acid and have a normality varying from 0.3 N to 5 N, and preferably from 0.3 N to 1 N.

The amount of sulfate ions added is such that the ratio between the molar concentration of sulfate ions and the final equivalent concentration of cerium (IV) ranges from 0.01 to 1.4 and preferably from 0.3 to 0.4.

The equivalent final concentration of cerium (IV) is represented by the equation:

$$[Ce^{IV} \text{ equiv.}] = \frac{[Ce^{IV}] \times V'}{V + V'}$$

in which:

$[Ce^{IV}]$ is the concentration in moles per liter of the solution of cerium (IV) salt;

V is the volume of the solution of sulfate ions; and

V' is the volume of the solution of cerium (IV).

The proportions between the aqueous solution of cerium (IV) salt and the aqueous solution of sulfate ions is such that the equivalent final concentration of cerium (IV) ranges from 0.2 to 1.0 mole/liter, and preferably from 0.3 to 0.6 mole/liter.

The precipitation of basic ceric sulfate, effected under those conditions above outlined, is preferably carried out at a temperature of from 70° C. up to the reflux temperature of the reaction medium, which is about 100° C.

It is easier to conduct the reaction at the reflux temperature as it is thus easy to control and reproduce.

In accordance with one first practical embodiment of the invention, the aqueous solution containing the sulfate ions is first heated until the selected desired temperature is attained within a predetermined range.

The solution of cerium (IV) salt is then introduced either fractionally or continuously; the cerium (IV) salt solution is typically added over a period of time of from 1 to 4 hours. Compare the examples to follow for specific illustration of suitable rates of addition of the cerium (IV) salt solution.

After completing the addition of said solution, the heating is continued until the cerium (IV) in the form of its basic sulfate has completely precipitated, whereupon the reaction mass is aged at this same temperature before filtering. In this case, the aging time ranges from 2 to 24 hours; the upper limit is not critical. However, a period of time which may range from 3 to 10 hours is typically satisfactory.

In accordance with a second embodiment of the first step of the process of the invention, the aqueous solution of the cerium (IV) salt and the aqueous solution containing the sulfate ions are mixed simultaneously at room temperature and the resultant mixture is heated until attaining the selected desired temperature within the predetermined range.

Once this temperature has been reached, the heating is continued until the cerium (IV) in the form of its basic sulfate has completely precipitated, whereupon the reaction mass is aged under the conditions described above, typically for 2 to 24 hours and preferably from 3 to 10 hours.

It should be pointed out that this embodiment is preferred since it makes it possible to obtain a ceric oxide having the greatest porosity.

The second step of the process of the invention consists of filtering, after reaction, the reaction mass which is in the form of a suspension, the temperature of which ranges from 90° C. to 100° C. This operation is carried out either before or after cooling the reaction mass to room temperature, namely, to a temperature ranging from about 10° C. to 25° C.

The filter cake is desirably washed to eliminate the nitrate ions adsorbed on the precipitate.

Such washing is preferably carried out with distilled water or water purified by ion exchange, water whose temperature may vary, as desired, from 5° C. to 90° C. One or more washings is typically satisfactory, generally one to three washings.

The washing can also be carried out with an organic solvent. Exemplary such solvents are aliphatic, cycloaliphatic or aromatic hydrocarbons, or aliphatic or cycloaliphatic alcohols, such as methanol, ethanol, n-propanol, isopropanol, n-butanol, isobutanol and neobutanol. One or more washings are carried out, typically one to three washings.

After washing, the water content of the filter cake ranges from 20% to 80% and typically from 20% to 50%.

A preferred embodiment of the process of the invention comprises carrying out an additional washing with a basic solution in order to displace a portion of the sulfate ions.

An aqueous ammonia solution is preferably used for this purpose, the concentration of which may vary, for example, from 0.1 N to 1 N.

Up to ten washings may be employed, but generally only one to four washings suffice.

The product obtained after filtration and successive washings is then dried in air or under reduced pressure on the order of $10^{-2}$ to 100 mm mercury. The drying temperature advantageously varies from 90° C. to 200° C.; the drying time is not critical and may range from 10 to 48 hours.

In the final step of the process of the invention, the dried product is calcined at a temperature which is preferably selected as the average temperature of intended use of the ceric oxide as catalyst.

The calcining temperature advantageously ranges from 300° C. to 500° C., and preferably from 350° C. to 450° C. The time of calcination typically ranges from about 30 minutes to ten hours.

The lower limit of the temperature range is not critical and may be lowered.

On the other hand, there is no advantage in increasing the upper limit of the calcining temperature, since a decrease in the specific surface of the product ceric oxide is noted. Furthermore, it is pointed out that the product ceric oxide has a maximum specific surface on the order of 150 to 180 m²/g after calcining at a temperature of 400° C. to 450° C. After calcination, the ceric oxide is recovered in very good yield since, when expressed as cerium (IV), it represents 80% to 98% of the cerium (IV) present in the initial solution of cerium (IV) salt.

It will also be appreciated that the process of the invention is extremely well adopted to be carried out continuously.

The process of the invention can be carried out in conventional apparatus. The step of the precipitation of the basic ceric sulfate is carried out in a reactor equipped with a thermo-regulated heating device, customary reaction control means (thermometer), agitating means (anchor or propeller agitation), and means for the introduction of the reagents.

Aging can advantageously be carried out in the reactor or in another reactor of the same type. The transfer of the reaction mass from one reactor to the other may be effected by gravity or by means of pumps.

The filtration of the resultant suspension can then be effected on a filter under the pressure of an inert gas such as nitrogen, on a filter under reduced pressure (Büchner, Nutche), or else on a continuous filtration device, for example, a rotary filter of the Vernay type or a band filter.

The precipitate is then placed in silica, porcelain or alumina boats and is then subjected to the drying operation, which may be carried out in any drying device, for example, in a stove which is either vented or maintained under reduced pressure.

It is then subjected to calcination, for example, in a chamber furnace, tunnel, muffle oven or rotary furnace provided with means enabling regulation of the temperature during the heat treatment.

By the process of the invention, a ceric oxide is produced which contains a certain amount of sulfate ions, the presence of which affects the specific surface obtained.

The amount of residual sulfate ions depends upon the amount of sulfate ions introduced during the precipitation reaction and on the fact that said ions have been eliminated to a greater or lesser extent during the washing operations, in particular during the washing with ammonia.

The Table I which follows sets forth, by way of illustration, the amounts of residual sulfate ions and the specific surfaces obtained, depending upon whether or not the precipitate was washed with ammonia and depending upon the number of washings with ammonia, in all cases the amount of sulfate ions added during the course of the precipitation, expressed by the molar ratio $[SO_4=]/[Ce^{II}eq]$, being 0.36 and the precipitate being washed once with water and then calcined for six hours at 400° C.

The residual amount of sulfate ions in the product ceric oxide is expressed by the molar ratio $[SO_4=]/[Ce^{II}]$.

TABLE I

| | Amount of residual sulfate ions | specific surface of $CeO_2$ |
|---|---|---|
| Without washing with ammonia | 0.30 | 60 to 120 m²/g |
| With one washing with 0.4 N ammonia | 0.09 | 120 to 160 m²/g |
| With four washings with 0.4 N ammonia | 0.0018 | 150 to 170 m²/g |
| With ten washings with 0.4 N ammonia | 0.0009 | 150 to 180 m²/g |

For catalytic uses of the product ceric oxide it is desirable that the amount of residual sulfate ions be such that the aforesaid ratio is less than 0.03. It is preferably less than 0.002.

Even more preferably, it is advisable that it be as close as possible to zero.

Figure 2:
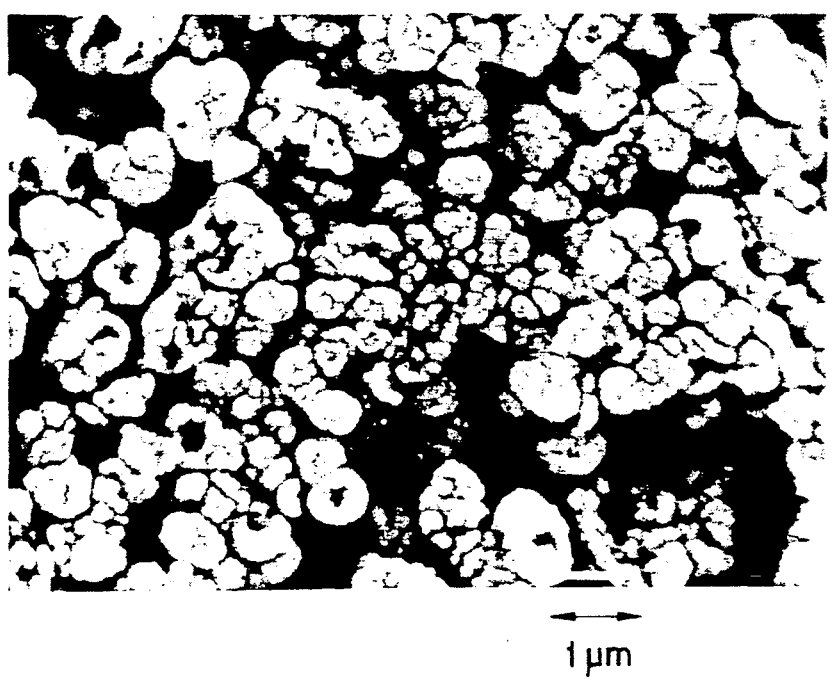

FIGS. 1 and 2 are photomicrographs taken with a scanning electronic microscope (enlargement: 300 and 12,000) which evidence the morphology of the ceric oxide obtained in accordance with the invention.

It will be noted that the particles of ceric oxide have pore dimensions of an average diameter of about 30 Å.

The uses to which the ceric oxide prepared in accordance with the invention can be put are very numerous. Mention may be made, in particular, of applications as filler, binder, wash coat, thickener, dispersant, reinforcer, pigment, adsorbent and raw material for the manufacture of ceramics and of glass polishing compositions.

The ceric oxide of the invention has an unexpectedly great surface, such that it is eminently well suited for use in the field of catalysis, either as catlayst, per se, or catalyst support.

The ceric oxide particulates of the invention may be employed as catalyst or catalyst support to carry out a wide variety of reactions such as, for example, dehydration, hydrosulfuration, hydrodenitrification, desulfurization, hydrodesulfurization, dehydrohalogenation, reforming, steam reforming, cracking, hydrocracking, hydrogenation, dehydrogenation, isomerization, dismutation, oxychlorination, dehydrocyclization of hydrocarbons or other organic compounds, oxidation and/or reduction reactions, the Claus reaction, the treatment of exhaust gases from internal combustion engines, demetallization, methanation, and shift conversion.

Too, the ceric oxide of the invention can be used either alone or in admixture with a wide variety of other oxides.

Due to its great chemical reactivity, it can also be advantageously used for the production of mixed catalyst supports, for example, $Al_2O_3$—MgO—$CeO_2$ (see published Japanese Patent Application No. 78/40,077).

In order to further illustrate the present invention and the advantages thereof, the following specific examples are given, it being understood that same are intended only as illustrative and in nowise limitative.

EXAMPLE 1

Into a 6-liter three-neck round-bottom flask provided with a thermometer, an agitator, reagent inlet means (metering pump) and a reflux condenser, and equipped with a heating device, there were introduced, at room temperature, in any order, 1909 cc of water purified by ion exchange and containing 37.4 g of ammonium sulfate $(NH_4)SO_4$ and 610 cc of a ceric nitrate solution containing 1.275 moles/liter of cerium (IV), 0.025 moles/liter of cerium (III) and having a free acidity of 0.365 N.

A mixture having an equivalent final cerium (IV) concentration of 0.465 moles/liter was obtained.

Said mixture was heated to the boiling point thereof and then refluxed for 24 hours.

Filtration of the resulting precipitate was carried out over fritted glass (porosity No. 3) and three washings with water were effected at 90° C.

The cerium (IV) contained in the mother liquors was determined by potentiometric titration, using a titrated solution of iron (II), which enabled determination of a precipitation yield of 96.3%.

Before calcining, four successive washings were carried out using an 0.4 N ammonia solution at 80° C.

The product obtained was next dried at 105° C. for 48 hours and then calcined in a muffle furnace for 6 hours at 400° C.

A ceric oxide was produced, containing sulfate ion in an amount such that the molar ratio $[SO_4=]/[Ce^{IV}]$ was equal to 0.002.

It had a specific surface of 164 m²/g.

The product ceric oxide was of fluorine-type structure, namely, face centered cubic.

The parameter and the intensity of the $CaF_2$ structure were as follows:

| (i) Lattice parameter | a = 5.435 ± 0.01Å |
|---|---|
| (ii) Crystallization rate | t = 55%. |

The lattice parameter of pure ceric oxide is 5.411 Å (JCPDS 4 0593).

It is therefore noted that the lattice parameter was slightly expanded.

EXAMPLE 2

This example demonstrates the influence of the washing with an ammonia solution on the specific surface of the product ceric oxide.

For this purpose, Example 1 is repeated, with the sole difference being that the washing with ammonia was eliminated.

The calcining was carried out under the same conditions.

A ceric oxide containing sulfate in an amount such that the molar ratio $[SO_4^=]/[Ce^{IV}]$ was equal to 0.26 was obtained.

It had a specific surface of 110 m²/g.

EXAMPLES 3 TO 5

These examples demonstrate the influence of the concentration of the $SO_4^=$ in the reaction medium on the specific surface of the product ceric oxide.

Example 1 was repeated, except that the amount of ammonium sulfate introduced into the reaction medium was varied.

The following Table II reports the specific surface of the ceric oxide obtained after calcining at 400° C. for 6 hours as a function of the $SO_4^=$ content of the reaction medium. For purposes of comparison, the results obtained in Example 1 have been included.

TABLE II

| No. of Example | Amount of ammonium sulfate introduced | Specific surface of CeO₂ |
|---|---|---|
| 3 | 6.9 g | 80 m²/g |
| 1 | 37.4 g | 164 m²/g |
| 4 | 69.11 g | 122 m²/g |
| 5 | 137 g | 78 m²/g |

EXAMPLE 6

In this example, a solution of ceric nitrate and an aqueous solution containing sulfate ions, identical to those described in Example 1, were used.

The precipitation of the basic sulfate was carried out by adding the ceric nitrate solution, at a rate of flow of 203.3 cc/hour, to the aqueous solution containing the sulfate ions which had previously been adjusted to reflux. Upon completion of the addition to said solution, the reaction mass was aged for three hours at the reflux temperature.

Filtering, drying and calcining identical to those described in Example 1 were then carried out on the basic sulfate obtained.

The ceric oxide thus produced had a high specific surface, on the order of 160 m²/g, but a smaller pore volume than the ceric oxide prepared as in Example 1.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A ceric oxide composition comprising ceric oxide particulates, said particulates consisting essentially of ceric oxide, said particulates having a B.E.T. specific surface of at least 130 m²/g, measured at a temperature ranging from 400° C. to 500° C. and said particulates having a content in residual sulfate ions, expressed as the molar ratio $[SO_4^=]/[Ce^{IV}]$, of less than 0.03.

2. Ceric oxide particulates consisting essentially of ceric oxide and having a B.E.T. specific surface of at least 130 m²/g, measured at a temperature ranging from 400° to 500° C.

3. The ceric oxide particulates as defined by claim 2, having a photomicrograph thereof comprising those of FIGS. 1 or 2.

4. Ceric oxide particulates according to claim 2 having a content in residual sulfate ions, expressed as the molar ratio $[SO_4^=]/[Ce^{IV}]$, of less than 0.03.

5. The ceric oxide particulates as defined by claim 4, having a B.E.T. specific surface of from 150 to 180 m²/g, measured at a temperature ranging from 400° C. to 500° C.

6. The ceric oxide particulates as defined by claim 4, having a content in residual sulfate ions, expressed as the molar ratio $[SO_4^=]/[Ce^{IV}]$, of less than 0.002.

7. The ceric oxide particulates as defined by claim 4, having an average pore diameters of about 30 Å.

* * * * *